(12) United States Patent
Yue

(10) Patent No.: US 6,726,290 B1
(45) Date of Patent: Apr. 27, 2004

(54) WHEEL COVER

(76) Inventor: Huang Tsai Li Yue, P.O. Box 90, Tainan (TW)

( * ) Notice: Subject to any disclaimer, the term of this patent is extended or adjusted under 35 U.S.C. 154(b) by 0 days.

(21) Appl. No.: 10/464,466

(22) Filed: Jun. 19, 2003

(51) Int. Cl.[7] ................................................. B60B 7/06
(52) U.S. Cl. .............................. 301/37.23; 301/37.32; 301/37.106; 301/37.34
(58) Field of Search ........................... 301/37.35, 37.36, 301/37.103, 37.104, 37.105, 37.37, 37.372, 37.373, 37.374, 37.375, 37.376, 37.42, 37.102, 37.23, 37.32, 37.106, 37.107, 37.25, 37.31, 37.34; 362/500, 249, 802

(56) References Cited

U.S. PATENT DOCUMENTS 5,752,745 A * 5/1998 Sheu ....................... 301/37.32
5,791,741 A * 8/1998 Sheu ....................... 301/37.34
6,059,375 A * 5/2000 Shryock ................... 301/37.34
6,575,537 B1 * 6/2003 Wang ....................... 301/37.23

* cited by examiner

Primary Examiner—Frantz F. Jules

(57) ABSTRACT

A wheel cover in the invention has a wheel cover body including fixing bases fixed thereon and each having at least one first hook hole; securing members connected to the fixing bases and each having at least one second hook hole; springs each having both ends for respectively hooking into each of the first hook holes and each of the corresponding second hook holes, whereby the securing members can be connected to the fixing bases and moved to and fro under the resilience of the springs so that in case that a tire of an automobile is forcedly deformed to jostle against the wheel cover while the automobile is driven on a rough road or runs over hard objects, the wheel cover body can follow the resilient to-and-fro movements of the securing members to prevent the wheel cover from coming off or being burst out of a wheel rim.

4 Claims, 5 Drawing Sheets

WHEEL COVER

BACKGROUND OF THE INVENTION

1. Field of the Invention

This invention relates to a wheel cover, particularly to one provided with a wheel cover body whose fixing bases are connected with securing members by springs, by which the securing members can be moved to and fro under the resilience of the springs so that in case that a tire of an automobile is forcedly deformed to jostle against the wheel cover of the present invention while the automobile is driven on a rough road or runs over hard objects in high speed, the wheel cover body can follow the resilient to-and-fro movements of the securing members under the resilience of the springs to prevent the wheel cover of the present invention from coming off or being burst out of a wheel rim.

2. Description of the Prior Art

Generally speaking, as shown in FIG. 1, a wheel cover i has a plurality of securing bases 10 fixed to and spaced apart equidistantly around near an outer peripheral edge thereof, and a steel ring 11 fitted in inner sides of the securing bases 10, by which the conventional wheel cover 1 is capable of being assembled with a wheel rim. However, the securing bases 10 are integrally formed with the conventional wheel cover 1 so that in case that an automobile is driven on a rough road or runs over hard objects in high speed, a plastic-made tire of the automobile is liable to be deformed under momentary strong force to make the steel ring 11 disengaged with the securing bases 10, thus resulting in a danger of having the conventional wheel cover 1 coming off or being burst out of the wheel rim.

SUMMARY OF THE INVENTION

The main purpose of the invention is to offer a wheel cover provided with a wheel cover body whose fixing bases are connected with securing members by springs, by which the securing members can be moved to and fro under the resilience of the springs so that in case that a tire of an automobile is forcedly deformed to jostle against the wheel cover of the present invention while the automobile is driven on a rough road or runs over hard objects, the wheel cover body can follow the resilient to-and-fro movements of the securing members under the resilience of the springs to prevent the wheel cover of the present invention from coming off or being burst out of a wheel rim.

The main feature of the invention is to provide a wheel cover mainly including:

a wheel cover body having a plurality of fixing bases fixed to and spaced apart equidistantly around near an outer peripheral edge thereof, each of the fixing bases provided with at least one first hook hole;

a plurality of securing members capable of being connected to the fixing bases of the wheel cover body, each of the securing members provided with at least one second hook hole corresponding to the at least one first hook hole of each of the fixing bases; and, a plurality of springs each provided with both ends capable of respectively hooking into each of the first hook holes of the fixing bases and each of the corresponding second hook holes of the securing members so that the securing members are capable of being connected to the fixing bases and moved to and fro under the resilience of the springs.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
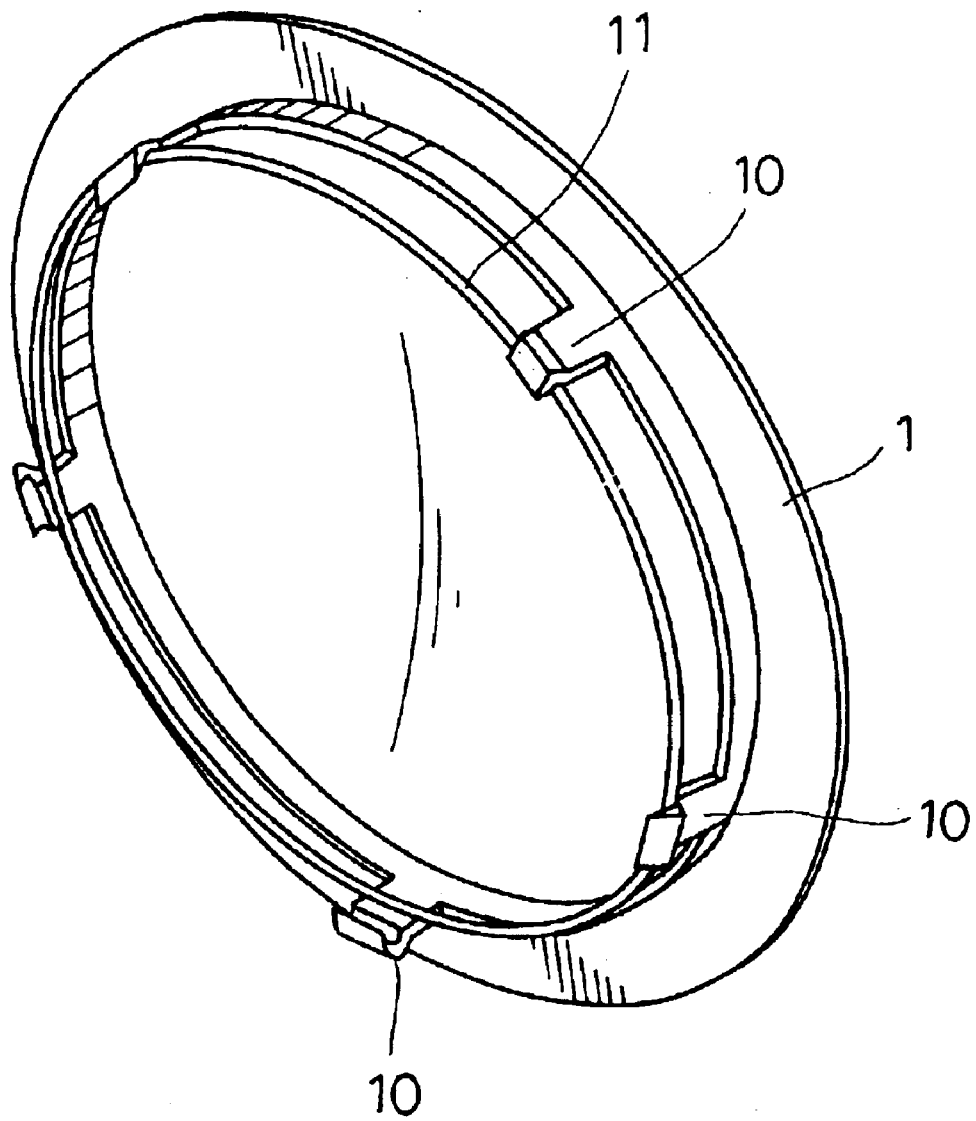
FIG. 1 is a structural view illustrating a known conventional wheel cover.
Figure 2:
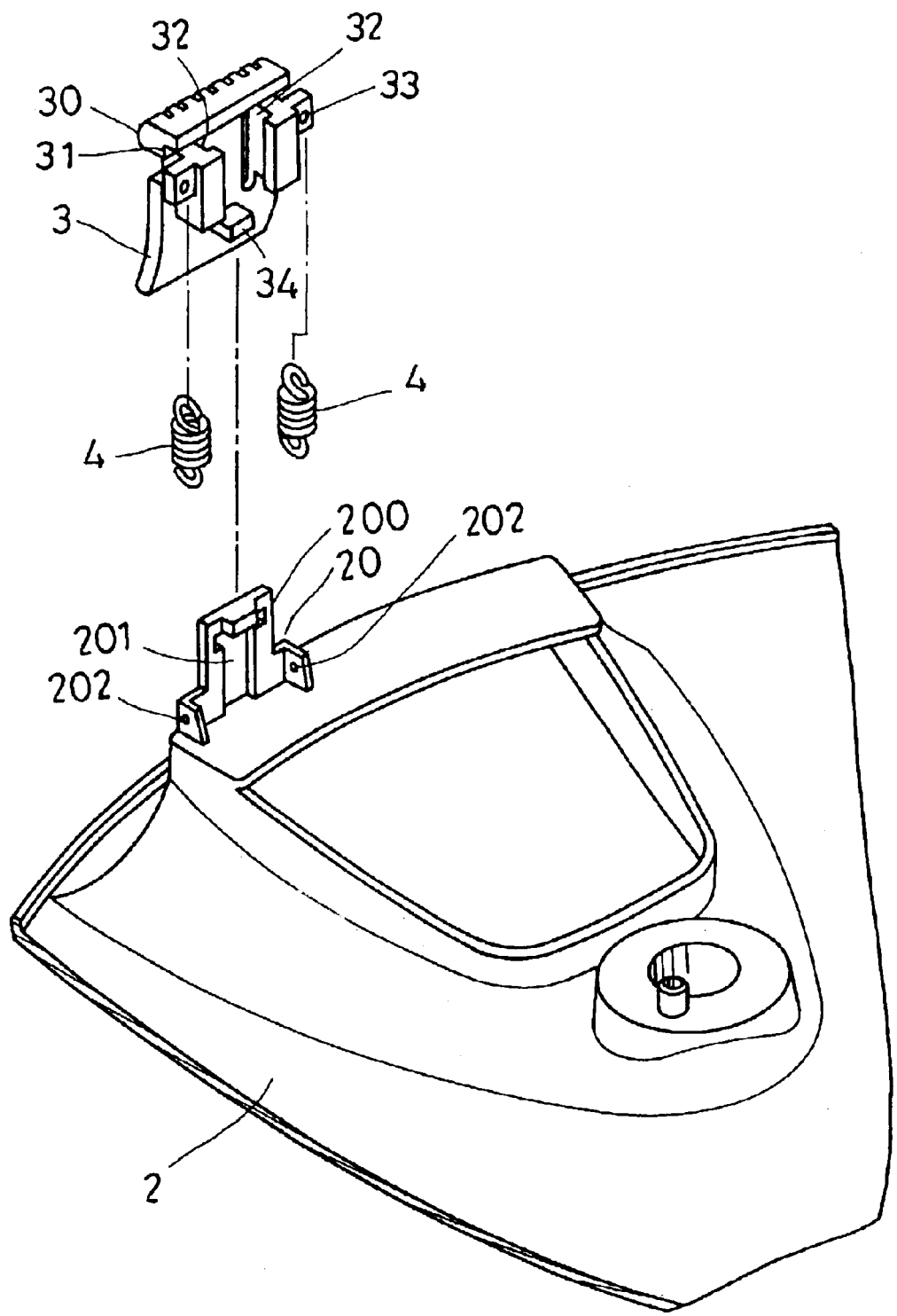
FIG. 2 is a partial exploded perspective view of a wheel cover in the present invention.
Figure 3:
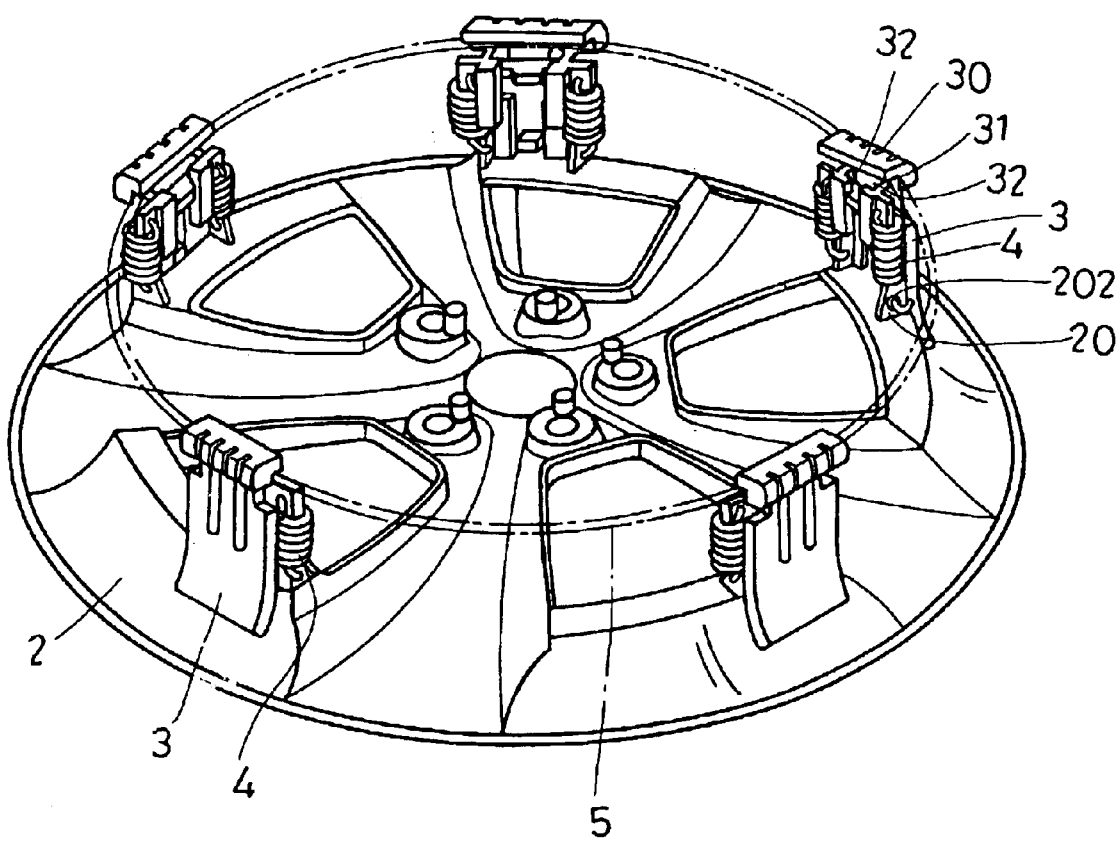
FIG. 3 is a perspective view of the wheel cover in the present invention.
Figure 4:
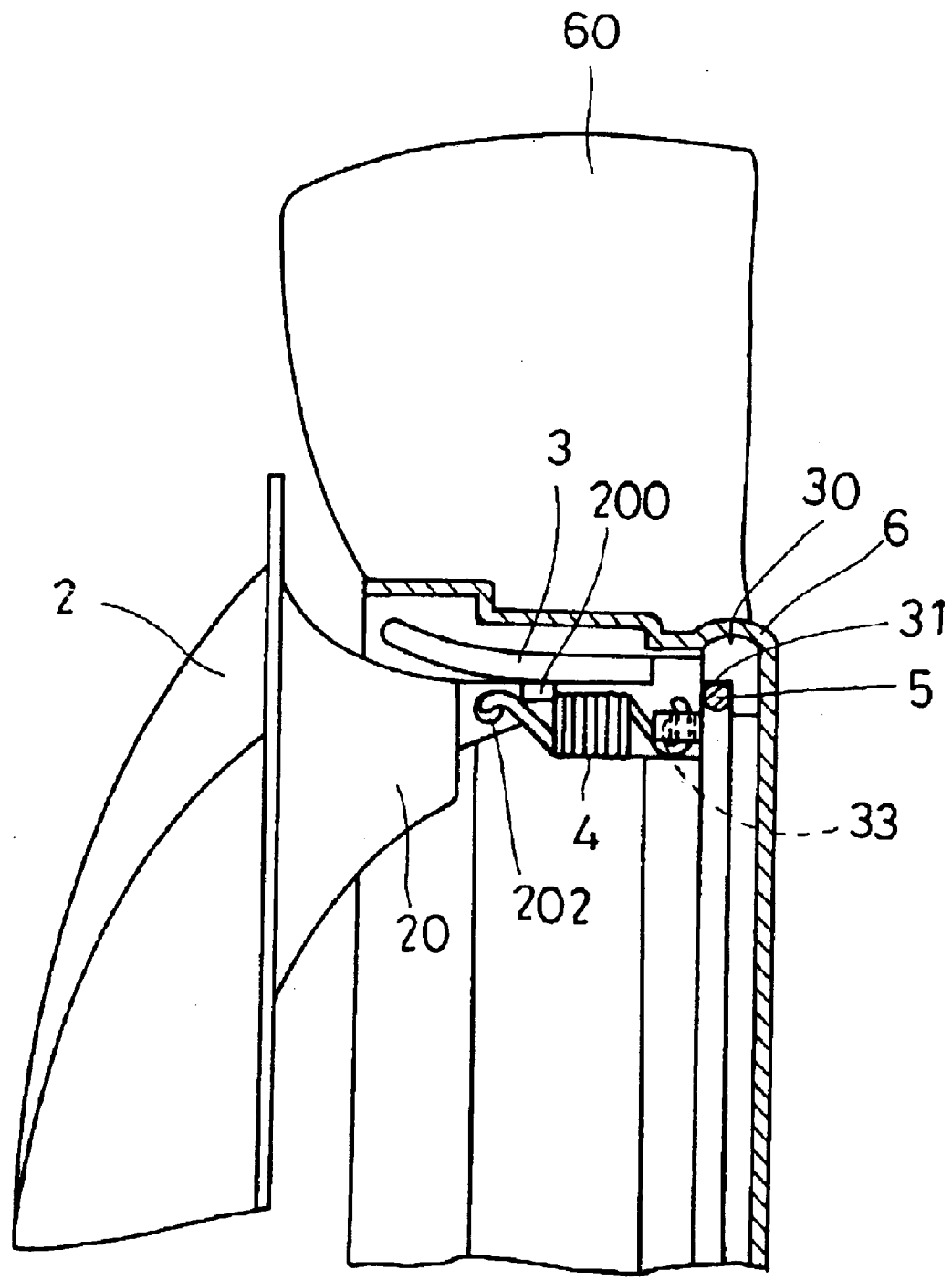
FIG. 4 is a partial sectional view of the wheel cover in the present invention; and, FIG. 5 is a side view of the wheel cover in the present invention, showing a wheel cover body can be moved to and fro under the resilience of a spring.

A preferred embodiment of a wheel cover in the present invention, as shown in FIGS. 2 to 4, mainly includes a wheel cover body 2, a plurality of securing members 3 and a plurality of springs 4 combined together.

The wheel cover body 2 has a plurality of fixing bases 20 fixed to and spaced apart equidistantly around near an outer peripheral edge thereof. Each of the fixing bases 20 is provided with an insert block 200 protruded upwards therefrom, and at least one first hook hole 202 disposed in a proper position thereof. Each of the insert blocks 200 is provided with an elongated slot 201 disposed at a lower portion of a middle part thereof.

The plurality of securing members 3 are capable of being connected to the fixing bases 20 of the wheel cover body 2. Each of the securing members 3 is provided with an engagement block 30 disposed at an outer side of an upper end thereof, an engagement groove 31 disposed in an inner sidewall thereof opposite to the engagement block 30, two insert grooves 32 respectively disposed at both sides thereof for being correspondingly inserted by both sides of each of the insert blocks 200 of the fixing bases 20, at least one second hook hole 33 disposed in a proper position thereof for corresponding to the at least one first hook hole 202 of each of the fixing bases 20, and a projection 34 protruded at a lower portion of an inner side thereof for being correspondingly inserted into each of the elongated slots 201 of the fixing bases 20.

Each of the plurality of springs 4 is provided with both ends capable of respectively hooking into each of the first hook holes 202 of the fixing bases 20 and each of the corresponding second hook holes 33 of the securing members 3 so that the securing members 3 are capable of being connected to the fixing bases 20 and moved to and fro under the resilience of the springs 4.

In assembling, referring to FIGS. 2 to 5, firstly insert each of the projections 34 of the securing members 3 into each of the elongated slots 201 of the fixing bases 20. Secondly, make each of the insert grooves 32 of the securing members 3 aligned to and inserted by the both sides of each of the insert blocks 200 of the fixing bases 20. Finally, hook the both ends of each of the springs 4 respectively into each of the first hook holes 202 of the fixing bases 20 and each of the corresponding second hook holes 33 of the securing members 3, by which an assemblage of the whole structure of the wheel cover in the present invention provided with the securing members 3 mounted thereon is completed.

In using, only to fit a steel ring 5 into the engagement grooves 31 of the securing members 3 firmly, and then engage the engagement blocks 32 of the securing members 3 with a wheel rim 6 securely, by which the wheel cover of the present invention is capable of being assembled on an outer side of the wheel rim 6.

Figure 5:
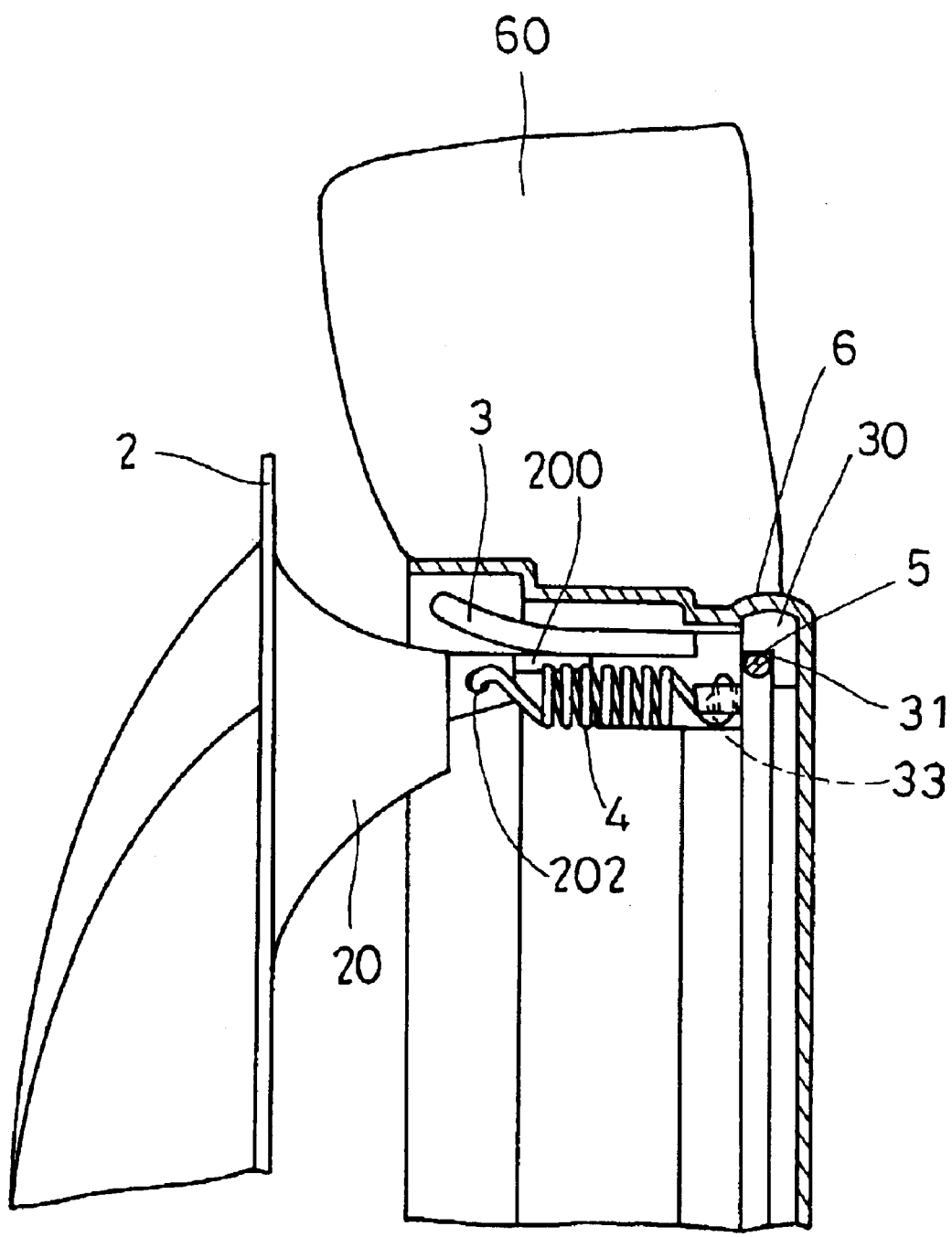

In case that a tire 60 of an automobile is deformed to jostle against the wheel cover of the present invention under momentary strong force while the automobile is driven on a rough road or runs over hard objects in high speed, the wheel cover body 2 is capable of following the resilient to-and-fro movements of the securing members 3 under the resilience of the springs 4 to prevent the wheel cover of the present invention from coming off or being burst out of the wheel rim 6, as shown in FIG. 5.

Moreover, the wheel cover of the present invention is adapted to be assembled with wheel rims of different sizes.

While the preferred embodiment of the invention has been described above, it will be recognized and understood that various modifications may be made therein and the appended claims are intended to cover all such modifications that may fall within the spirit and scope of the invention.

What is claimed is:

1. A wheel cover comprising:

a wheel cover body having a plurality of fixing bases fixed to and spaced apart equidistantly around near an outer peripheral edge thereof, each of said fixing bases provided with at least one first hook hole;

a plurality of securing members capable of being connected to said fixing bases of said wheel cover body, each of said securing members provided with at least one second hook hole corresponding to said at least one first hook hole of each of said fixing bases;

a plurality of springs each provided with both ends capable of respectively hooking into each of said first hook holes of said fixing bases and each of said corresponding second hook holes of said securing members so that said securing members are capable of being connected to said fixing bases and moved to and fro under the resilience of said springs; and, whereby said securing members are capable of being connected to said fixing bases with each of said first hook holes of said fixing bases and each of said corresponding second hook holes of said securing members respectively hooked by said both ends of each of said springs so as to form said wheel cover of the invention provided with said securing members mounted thereon and adapted to be assembled with a wheel rim, thereby in case that a tire of an automobile is forcedly deformed to jostle against said wheel cover while said automobile is driven on a rough road or runs over hard objects in high speed, said wheel cover body is capable of following the resilient to-and-fro movements of said securing members under the resilience of said springs to prevent said wheel cover from coming off or being burst out of said wheel rim.

2. The wheel cover as claimed in claim 1, wherein each of said fixing bases of said wheel cover body is provided with an insert block protruded upwards therefrom; each of said securing members is provided with two insert grooves respectively disposed at both sides thereof for being correspondingly inserted by both sides of each of said insert blocks of said fixing bases.

3. The wheel cover as claimed in claim 2, wherein each of said insert blocks of said fixing bases is provided with an elongated slot disposed at a lower portion of a middle part thereof; each of said securing members is provided with a projection protruded at a lower portion of an inner side thereof for being correspondingly inserted into each of said elongated slots of said fixing bases so that said securing members are capable of being engaged with said fixing bases and stably slide relative to said fixing bases by having said projections of said securing members confined within said elongated slots of said fixing bases.

4. The wheel cover as claimed in claim 1, wherein each of said securing members is provided with an engagement groove disposed in an inner sidewall thereof for a steel ring to be fitted therein so that said wheel cover is capable of being assembled on an outer side of a wheel rim securely.

* * * * *